US010567446B2

(12) United States Patent
Azim et al.

(10) Patent No.: US 10,567,446 B2
(45) Date of Patent: *Feb. 18, 2020

(54) METHOD AND SYSTEM FOR OVER-THE-TOP VOICE FOR INTERNET OF THINGS DEVICES

(71) Applicant: Verizon Patent and Licensing Inc., Arlington, VA (US)

(72) Inventors: Rezwanul Azim, Walnut Creek, CA (US); Priscilla Lau, Fremont, CA (US); Emerando M. Delos Reyes, Pleasant Hill, CA (US); Suzann Hua, Walnut Creek, CA (US); Wing-Cheong V. Yeung, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/161,493

(22) Filed: Oct. 16, 2018

(65) Prior Publication Data

US 2019/0052684 A1    Feb. 14, 2019

Related U.S. Application Data

(63) Continuation of application No. 15/589,300, filed on May 8, 2017, now Pat. No. 10,135,883.

(51) Int. Cl.
| | |
|---|---|
| *H04L 29/06* | (2006.01) |
| *H04W 8/18* | (2009.01) |
| *H04W 12/06* | (2009.01) |
| *H04W 48/18* | (2009.01) |
| *H04M 1/253* | (2006.01) |

(52) U.S. Cl.
CPC ........ *H04L 65/1069* (2013.01); *H04L 65/104* (2013.01); *H04L 65/1006* (2013.01); *H04L 65/1016* (2013.01); *H04L 65/1073* (2013.01); *H04L 65/1076* (2013.01); *H04W 8/18* (2013.01); *H04W 12/06* (2013.01); *H04M 1/2535* (2013.01); *H04W 48/18* (2013.01)

(58) Field of Classification Search
CPC .............. H04L 65/1069; H04L 65/104; H04L 65/1006; H04L 65/1016; H04L 65/1073; H04W 8/18; H04W 12/06; H04W 48/18
USPC ..... 370/310.2, 328, 338, 349, 354, 355, 356
See application file for complete search history.

(56) References Cited

U.S. PATENT DOCUMENTS

| | | |
|---|---|---|
| 7,260,536 B1 | 8/2007 | Abu-Samaha |
| 7,657,652 B1 | 2/2010 | Balaji |
| 8,611,509 B1 | 12/2013 | Basart et al. |
| 10,135,883 B1 * | 11/2018 | Azim .................. H04L 65/1006 |
| 2017/0251105 A1 | 8/2017 | Chatterjee et al. |

* cited by examiner

*Primary Examiner* — Brenda H Pham

(57) ABSTRACT

A method, a device, and a non-transitory storage medium are provided to receive from an end device, a session establishment message pertaining to a voice service that restricts the end device to place a voice call to and receive a voice call from a designated call center; replace a uniform resource identifier of the designated call center included in the session establishment message, with an enterprise identifier included in subscription data pertaining to the end device; select, based on the enterprise identifier, another network device to transmit the session establishment message; and transmit the session establishment message to another device based on the selection.

20 Claims, 14 Drawing Sheets

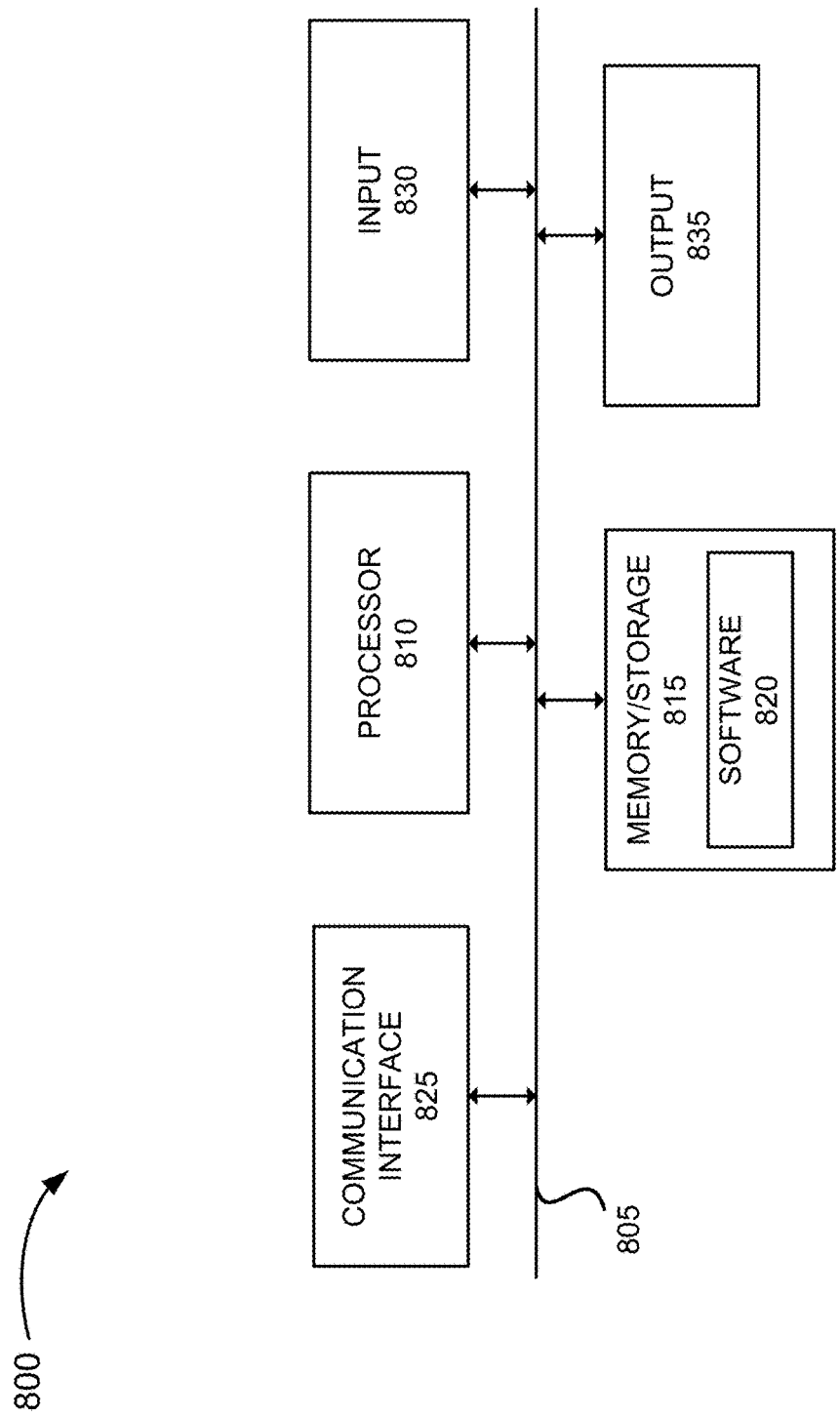

METHOD AND SYSTEM FOR OVER-THE-TOP VOICE FOR INTERNET OF THINGS DEVICES

CROSS-REFERENCE TO RELATED APPLICATION

This application is a continuation of U.S. patent application Ser. No. 15/589,300 filed on May 8, 2017, the contents of which are incorporated herein by reference.

BACKGROUND

Internet of Things (IoT) technology refers to a wide range of devices. Since IoT technology has nearly limitless applications that can be leveraged to form new and useful services, interest among service providers and developers in IoT technology continues to increase. However, service providers and developers are always mindful of the complexity and cost of an IoT device, as well as its impact on network resources in a network.

BRIEF DESCRIPTION OF THE DRAWINGS

FIG. 8 is a diagram illustrating exemplary components of a device that may correspond to one or more of the devices illustrated herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

IoT devices have become widespread and their uses have continued to expand. However, the cost and complexity of IoT devices in view of their intended functions or use is always a consideration. For example, some IoT devices may provide users with a voice service. Depending on the implementation, the IoT device may include an Internet Protocol Multimedia Subsystem (IMS) client that provides access to the voice service. The voice service may provide advanced calling features and may allow calls to be placed to various destinations. From the network perspective, the IoT device may use the resources of an IMS network, such as a call processing service, to implement the voice service. Additionally, the IoT device may register with the IMS network subsequent to every boot-up and/or has an "always on" registration with the IMS network without regard to how often a user of the IoT device may actually use the voice service. In this regard, the behavior profile of low usage IoT voice calling devices may unnecessarily waste the allocation of valuable IMS network resources.

According to exemplary embodiments, an over-the-top (OTT) voice service configured for an IoT device is described. According to an exemplary embodiment, the OTT voice service is limited to a preconfigured destination and does not provide for advanced calling features. According to an exemplary embodiment, the IoT device may be restricted to placing voice calls to and receiving voice calls from a designated call center. That is, the IoT device is not open to call all destinations like call origination from regular mobile phones. According to an exemplary embodiment, the IoT device includes a Session Initiation Protocol (SIP) client and does not include an IMS client. According to an exemplary embodiment, the IoT device does not register with a network until a voice call is initiated by a user. According to an exemplary embodiment, the IoT device may remain registered with the network for a limited time period subsequent to the ending of the voice call. According to an exemplary embodiment, the network routes the voice call to a call center based on a mapping of an enterprise identifier associated with the IoT device. According to an exemplary embodiment, the voice service may be provided without using network resources of an IMS network. For example, according to an exemplary embodiment, the voice service may be provided using a voice gateway that is not a part of the IMS network. In this way, network resources allocated to the voice service may more appropriately be aligned to the behavior profile of a low usage and a call destination-restricted IoT device.

Figure 1:
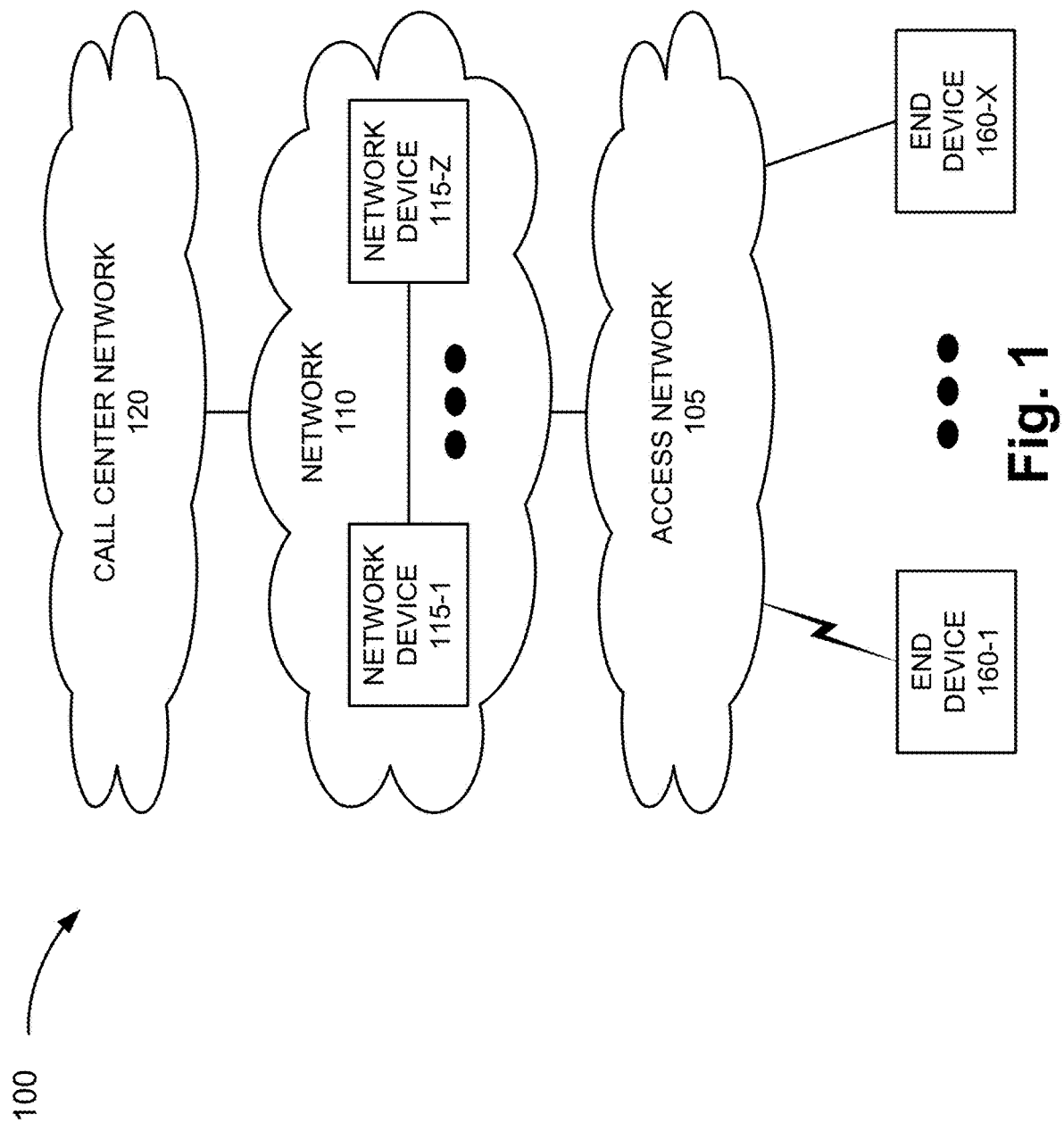
FIG. 1 is a diagram illustrating an exemplary environment in which an exemplary embodiment of a voice service may be implemented.

FIG. 1 is a diagram illustrating an exemplary environment 100 in which an exemplary embodiment of a voice service may be implemented. As illustrated, environment 100 includes an access network 105, a network 110, and a call center network 120. Network 110 includes network devices 115-1 through 115-Z (also referred to collectively as network devices 115 and, individually or generally as network device 115). Environment 100 also includes end devices 160-1 through 160-X (also referred to collectively as end devices 160 and, individually or generally as end device 160). According to other embodiments, environment 100 may include additional networks, fewer networks, and/or different types of networks than those illustrated and described herein.

Environment 100 includes communication links between the networks and between the devices. Environment 100 may be implemented to include wired, optical, and/or wireless communication links among the devices and the networks illustrated. A communicative connection via a communication link may be direct or indirect. For example, an indirect communicative connection may involve an intermediary device and/or an intermediary network not illustrated in FIG. 1. The number and the arrangement of communication links illustrated in environment 100 are exemplary.

A device or an element may be implemented according to a centralized computing architecture, a distributed computing architecture, or a cloud computing architecture (e.g., an elastic cloud, a private cloud, a public cloud, etc.). Additionally, a device or an element may be implemented according to one or multiple network architectures (e.g., a client device, a server device, a peer device, a proxy device, and/or a cloud device).

Access network 105 includes one or multiple networks of one or multiple types. For example, access network 105 may be implemented to include a terrestrial network. According to an exemplary implementation, access network 105 includes a RAN. For example, the RAN may be a Third Generation (3G) RAN, a 3.5G RAN, a Fourth Generation (4G) RAN, a 4.5G RAN, or a future generation RAN (e.g., a Fifth Generation (5G) RAN). By way of further example, access network 105 may include an Evolved UMTS Terrestrial Radio Access Network (E-UTRAN) of a Long Term Evolution (LTE) network or an LTE-Advanced (LTE-A) network, a U-TRAN, a Universal Mobile Telecommunications System (UMTS) RAN, a Global System for Mobile Communications (GSM) RAN, a GSM EDGE RAN (GERAN), a Code Division Multiple Access (CDMA) RAN, a Wideband CDMA (WCDMA) RAN, an Ultra Mobile Broadband (UMB) RAN, a High-Speed Packet Access (HSPA) RAN, an Evolution Data Optimized (EV-DO) RAN, or the like (e.g., a public land mobile network (PLMN), etc.). Access network 105 may also include other types of networks, such as a WiFi network, a local area network (LAN), a personal area network (PAN), or other type of network that provides access to or can be used as an on-ramp to network 110. According to other exemplary implementations, access network 105 may include a wired network. For example, the wired network may include a cable network, an optical network, an Integrated Services Digital Network (ISDN), a plain old telephone system (POTS), a digital subscriber line (DSL) network, or other type of analog or digital network.

Network 110 includes one or multiple networks of one or multiple types. For example, network 110 may be implemented to include a terrestrial network. According to an exemplary implementation, network 110 includes a complementary network pertaining to the one or multiple RANs described. For example, network 110 may include a core network, such as the core part of an LTE network or an LTE-Advanced network (e.g., an evolved packet core (EPC) network), a CDMA core network, a GSM core network (e.g., a network switching subsystem (NSS)), and so forth. Depending on the implementation, network 110 may include various network devices, such as, for example, a gateway device, a support node, a serving node, a mobility management entity (MME), as well other network devices that provide various network-related functions and/or services, such as charging and billing, security, authentication and authorization, network policy enforcement, management of subscriber profiles, and/or other functions and/or services that facilitate the operation of the core network. According to another exemplary implementation, access network 105 may include the complementary network of the one or multiple RANs described.

Network 110 may also include a network other than the core network. For example, network 110 may also be implemented to include a service or an application-layer network, the Internet, the World Wide Web, an IMS network, a Rich Communication Service (RCS) network, a cloud network, a packet-switched network, a Signaling System No. 7 (SS7) network, a telephone network, a private network, a public network, a telecommunication network, an IP network, or some combination thereof.

According to an exemplary embodiment, network 110 provides the voice service, as described herein. For example, network devices 115 include logic that provides the voice service. The voice service does not provide advanced calling features and allows for voice calls placed to and received from a designated call center (e.g., a "hotline" service between end device 160 and the call center). The voice service provides an OTT, low-cost calling service that may be infrequently used by users. As described herein, end device 160 registers with network device 115 only when a voice call is placed, and after the voice call is terminated, end device 160 may remain registered for a limited, but configurable time period. For example, the limited time period may be a sufficient period of time to allow a subsequent voice call to occur if an unintended disconnection or failure were to occur during the initial voice call. The voice service may also provide that end device 160 may receive an incoming call from the call center only when end device 160 initiated a previous voice call to the call center. The voice service may be implemented with a dedicated call processing server (e.g., a voice gateway) and without the use of high-cost IMS network resources. The voice service may be implemented with a routing device (e.g., a session border controller) that routes voices calls to and from end device 160. The voice service may be implemented using an enterprise identifier, as described herein.

Call center network 120 may include one or multiple networks of one or multiple types. For example, call center network 120 includes a network that provides call center services. By way of further example, although not illustrated, call center network 120 may include an automatic call distribution (ACD) device, an interactive voice response (IVR) device, a computer telephony integration (CTI) device, a customer relationship management (CRM) device, a call data device, a storage device that stores a customer database, a Private Branch Exchange (PBX), or some combination of these devices. Call center network 120 may also include end devices (e.g., computers, telephones, etc.) via which users (e.g., customer support representatives, etc.) may speak to users of end devices 160. According to some exemplary implementations, the call center services of call center network 120 may include emergency call center services (e.g., police, 911, fire, medical, etc.). According to other exemplary implementations, the call center services of call center network 120 may include customer support for end device 160 or other service pertaining to end device 160.

End device 160 includes a device that has voice communication capabilities that is configurable to provide the voice service, as described herein. For example, end device 160 may be implemented as an alarm panel, an emergency call box (e.g., in an elevator), a smart appliance (e.g., a refrigerator, a washer, etc.), a wearable device, an automated teller machine (ATM), a kiosk, a vending machine, a vehicular communication device, or other end user device/IoT device. According to an exemplary embodiment, end device 160 includes a SIP client. According to an exemplary embodiment, the SIP client would use network device 115 for signaling and media associated with a voice call.

Figure 2:
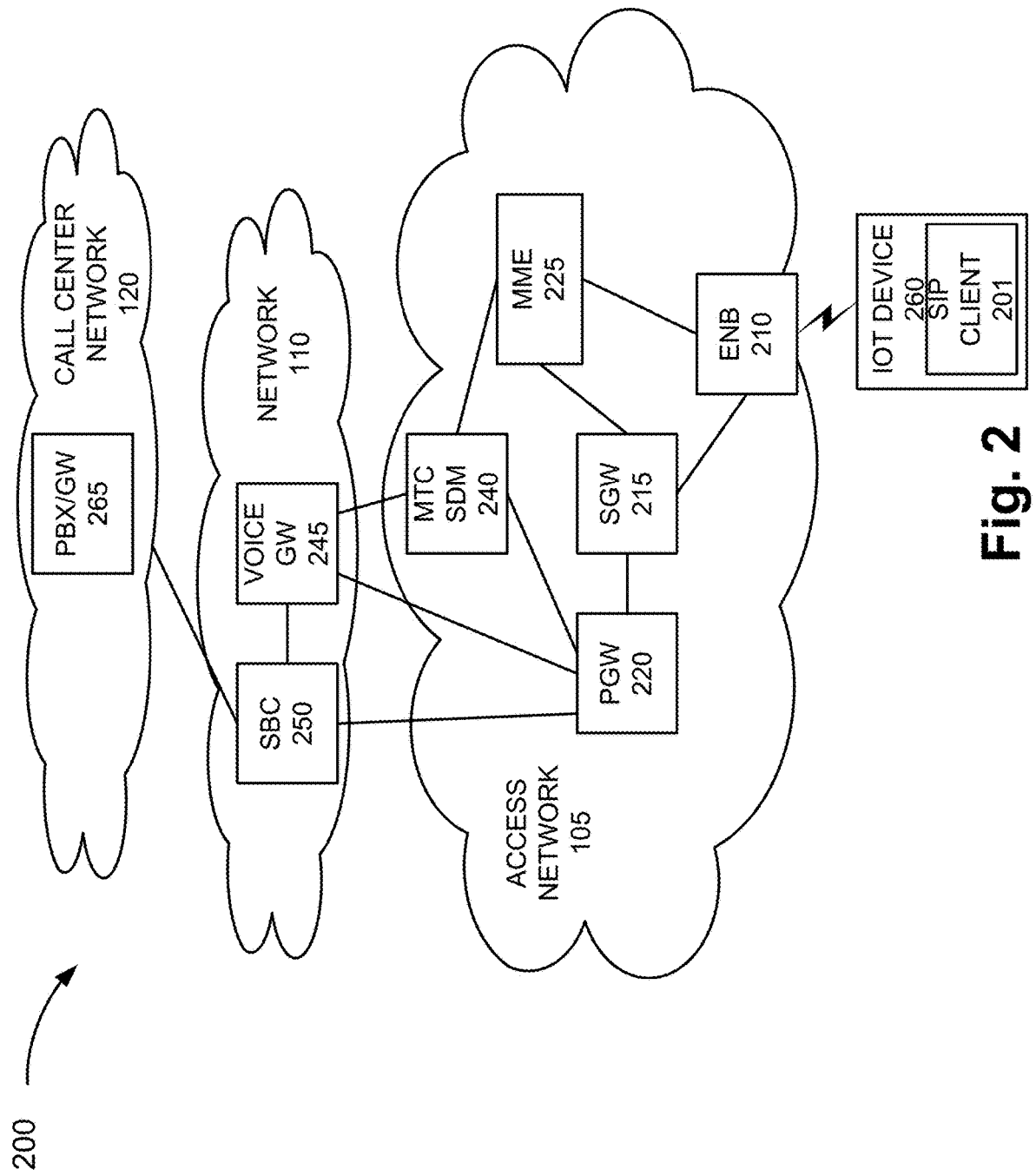
FIG. 2 is a diagram illustrating an exemplary environment in which an exemplary embodiment of the voice service may be implemented.

FIG. 2 is a diagram illustrating an exemplary environment 200 that provides the voice service, as described herein. For example, environment 200 is an exemplary implementation of environment 100. According to this exemplary implementation, access network 105 may be implemented to include an eNB 210 of an E-UTRAN. Additionally, according to this exemplary implementation, access network 105 includes an evolved packet core (EPC) network. For example, access network 105 includes a serving gateway (SGW) 215, a packet data network (PDN) gateway (PGW)

220, and an MME 225. Access network 105 further includes a machine-type communication (MTC) subscriber data manager (SDM) 240.

Network 110 includes a voice gateway (VGW) 245 and a session border controller (SBC) 250. VGW 245 and SBC 250 provide various functions in support of the voice service, as described herein. Call center network 120 includes a private branch exchange and gateway (PBX/GW) 265. According to this example, end device 160 is implemented as an IoT device 260 that includes a SIP client 201.

The number and arrangement of communication links illustrated in FIG. 2 are exemplary. eNB 210, SGW 215, PGW 220, and MME 225 may each operate according to an LTE/LTE-A standard. MTC SDM 240 includes a network device that may store subscription profile data. For example, MTC SDM 240 may be implemented to include a home subscriber server (HSS), an authentication, authorization, and accounting (AAA) server, a home location register (HLR), a subscriber profile repository (SPR), a user profile server function (USPF), or some combination thereof. According to an exemplary implementation, the subscription data includes an enterprise identifier that pertains to the voice service, as described herein.

According to an exemplary embodiment, VGW 245 includes an interface to communicate with MTC SDM 240. For example, VGW 245 may include an Sh interface that allows VGW 245 to query MTC SDM 240 for subscription data pertaining to IoT device 260. According to an exemplary embodiment, VGW 245 stores data that is used to determine whether IoT device 260 is authorized to use the voice service. For example, VGW 245 may store a whitelist of enterprise identifiers that are allowed to use the voice service. According to another exemplary embodiment, VGW 245 does not provide an authorization service and/or does not store the whitelist. According to an exemplary embodiment, VGW 245 stores information obtained from a registration of IoT device 260 (e.g., a SIP registration) and retains the information for a limited, but configurable time period after a voice call is completed. For example, VGW 245 may include a timer. According to an exemplary implementation, the limited time period may be a sufficient period of time that allows a subsequent voice call to be made if an unintended disconnection or a failure were to occur during the initial voice call. By way of further example, the limited time period may be from about 1 minute to about 30 minutes, with about 10 minutes being preferred. Upon expiration of the limited time period, VGW 245 unregisters IoT device 260 from the voice service.

According to an exemplary embodiment, VGW 245 replaces a uniform resource identifier (URI) (e.g., a Request-URI) or other destination identifier of the call center, which is included in a call setup message received from IoT device 260, with the enterprise identifier included in the subscription data. According to an exemplary embodiment, VGW 245 generates charging data records (CDRs) for billing and/or statistical purposes pertaining to the voice service.

According to an exemplary embodiment, SBC 250 provides voice call routing to call center network 120 based on a mapping of enterprise identifiers to trunk identifiers (e.g., Internet Protocol (IP) trunk identifiers). According to an exemplary embodiment SBC 250 provides an inline transcoding service. According to an exemplary embodiment, SBC 250 inserts the enterprise identifier into a call setup message received from call center network 120. PBX/GW 265 includes a network device that provides PBX and gateway services.

Figure 3A:
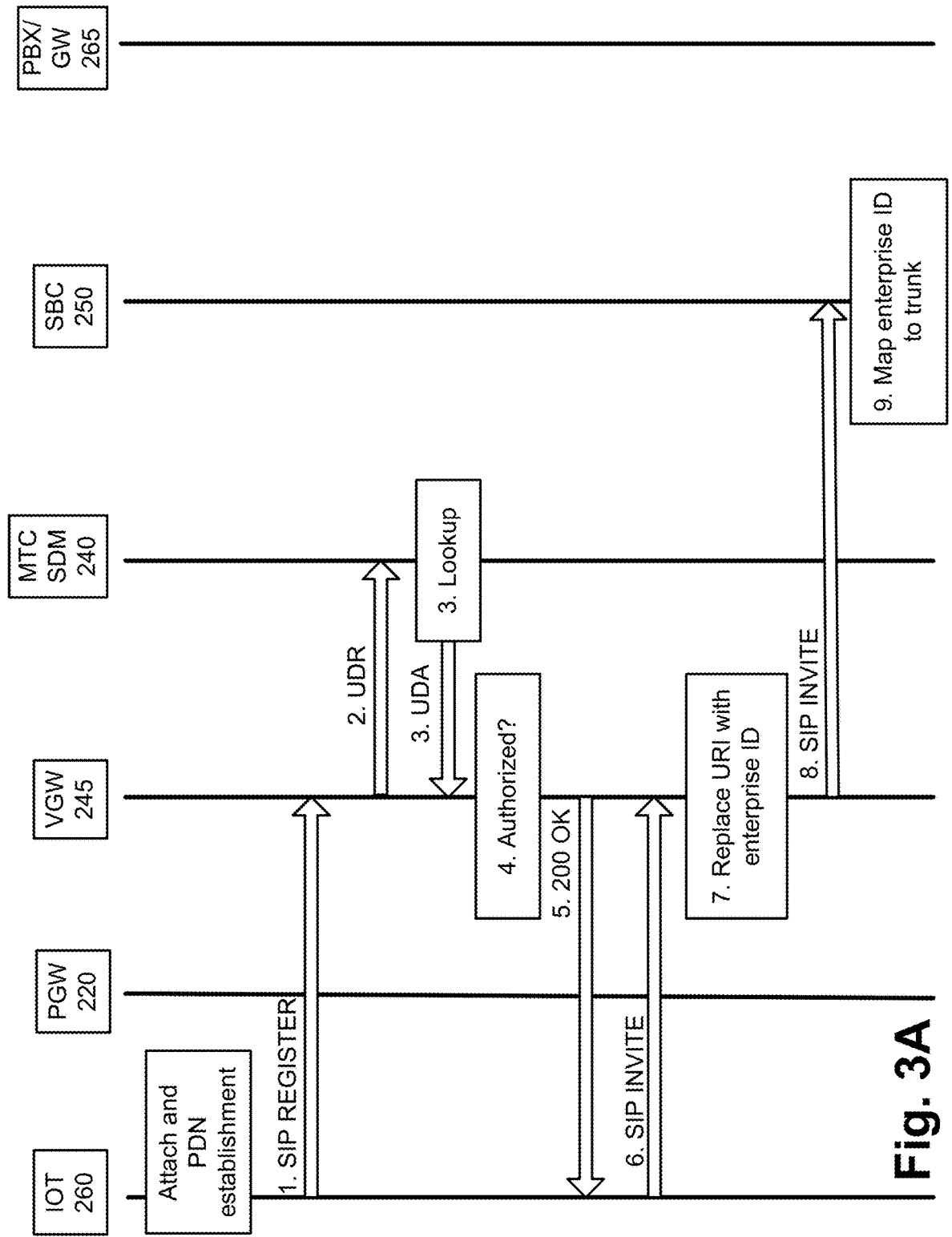
FIGS. 3A and 3B are diagrams illustrating an exemplary process of the voice service.
Figure 3B:
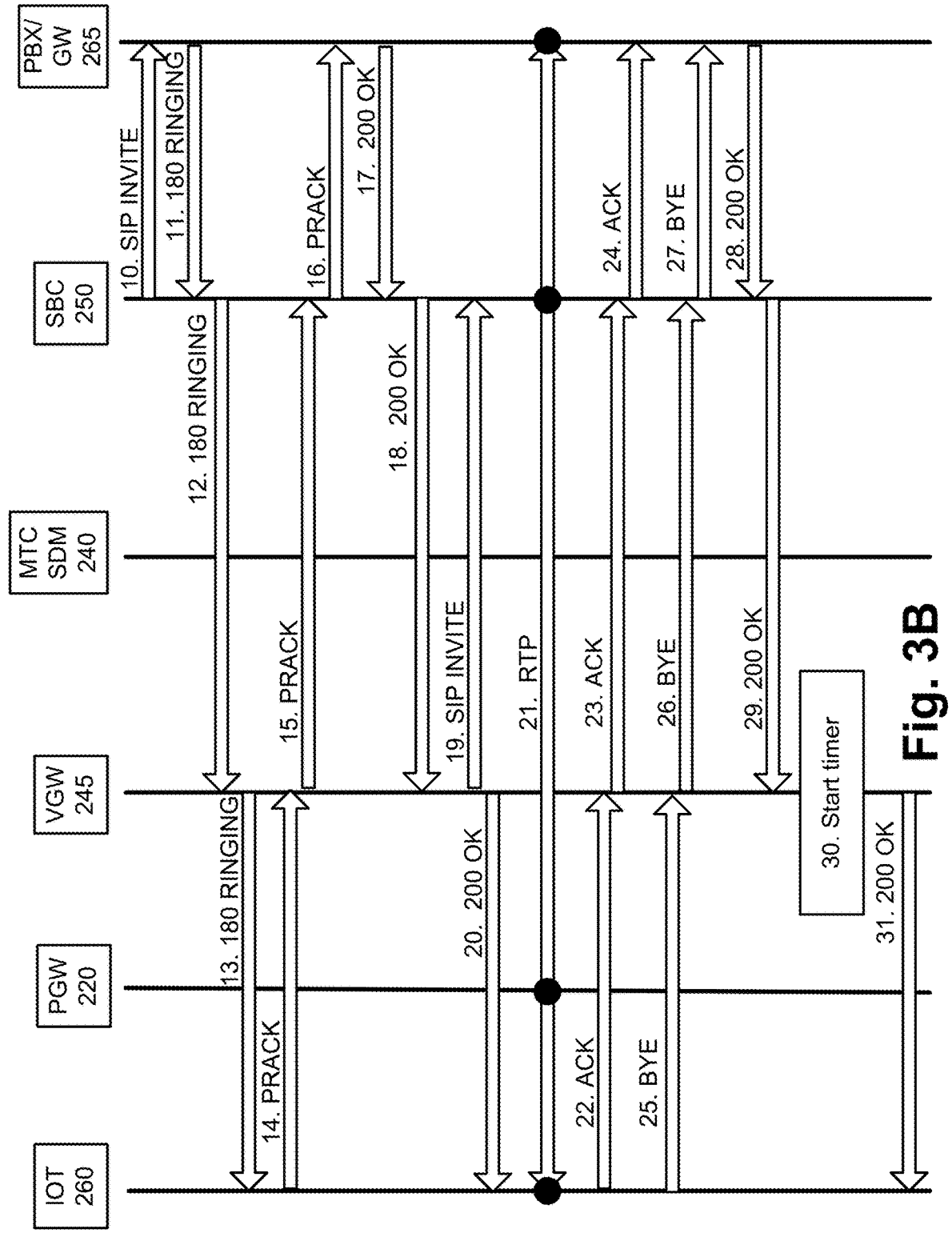
Figure 4A:
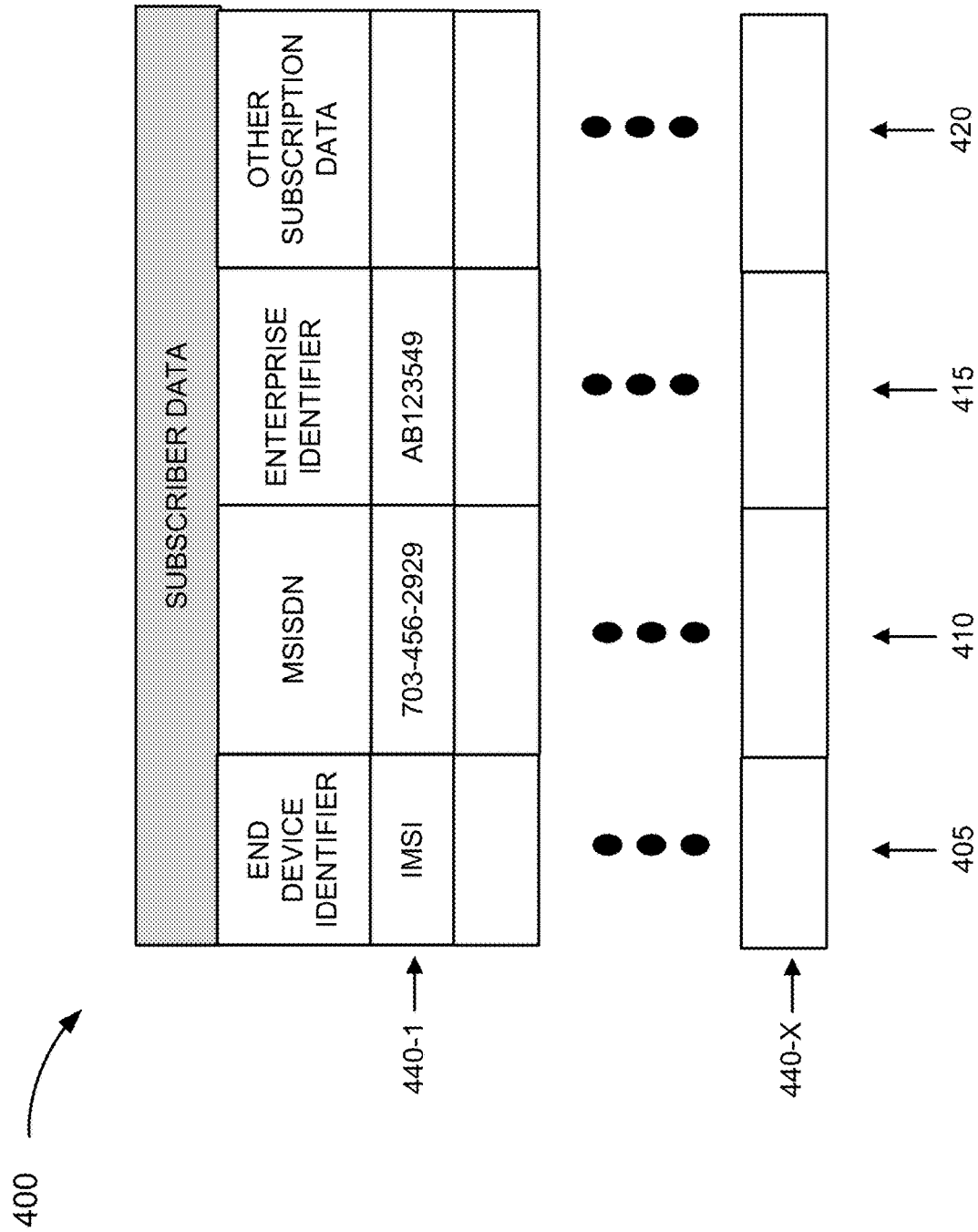
FIG. 4A is a diagram illustrating an exemplary table that stores exemplary subscription data.

FIGS. 3A and 3B are diagrams illustrating an exemplary process of the voice service in which IoT device 260 establishes a voice call with call center network 120. Referring to FIG. 3A, according to this exemplary scenario, it may be assumed that IoT device 260 has attached and established a PDN connection with access network 105. Thereafter, a user of IoT device 260 may initiate a voice call. In response, illustrated as step (1), IoT device 260 may generate and transmit a SIP Register message to VGW 245. The SIP Register message may include an address of record and a contact address. In step (2), in response to receiving the SIP Register message, VGW 245 generates and transmits a User Data Request (UDR) to MTC SDM 240. The UDR may include contact address information obtained from the SIP Register message. For example, the UDR may include a Mobile Station International Subscriber Directory Number (MSISDN) and/or other IoT device identifier. In step (3), MTC SDM 240 may perform a lookup for subscription data in response to receiving the UDR. For example, MTC SDM 240 may include a database that stores subscription data. For example, referring to FIG. 4A, an exemplary table 400 is illustrated, which stores exemplary subscription data. As illustrated, table 400 includes an end device identifier field 405, an MSISDN field 410, an enterprise identifier field 415, and other subscription data field 420. As further illustrated, table 400 includes records 440-1 through 440-X that each includes a grouping of fields 405 through 420 that may be correlated. The subscription data is illustrated in tabular form merely for the sake of description. The subscription data may be implemented in a data structure different from a table.

End device identifier field 405 stores data that indicates an identifier of IoT device 260. For example, end device identifier field 405 may store an International Mobile Subscriber Identity (IMSI), a network address (e.g., a Media Access Control (MAC) address, an Internet Protocol (IP) address), or other unique identifier that identifies IoT device 260.

MSISDN field 410 stores data that indicates an MSISDN or telephone number of IoT device 260. Enterprise identifier field 415 stores data that indicates an identifier (e.g., a numeric string, an alphanumeric string, etc.) of the voice service. For example, the enterprise identifier may indicate or be correlated to various aspects of the voice service, such as the particular IoT device(s) 260 subscribed to the voice service, the VGW(s) 245 and the SBC(s) to provide the voice service to the particular IoT device(s) 260, the trunk(s) to use to route voice calls, and the single or particular calling center accessible by the particular IoT device(s) 260, as described herein. Other subscription data field 420 stores data that indicates parameters and values pertaining to a network service, such as a subscribed access point name (APN), an identifier for a PGW through which the subscribed APN can be accessed, and a Quality of Service (QoS) profile. According to other exemplary implementations, table 400 may store additional, fewer, and/or different instances of subscription data. For example, table 400 may not include enterprise field 415. Rather, table 400 may include a routing field that stores a network address (e.g., a URL) and/or routing information. The values illustrated in table 400 are exemplary.

Figure 4B:
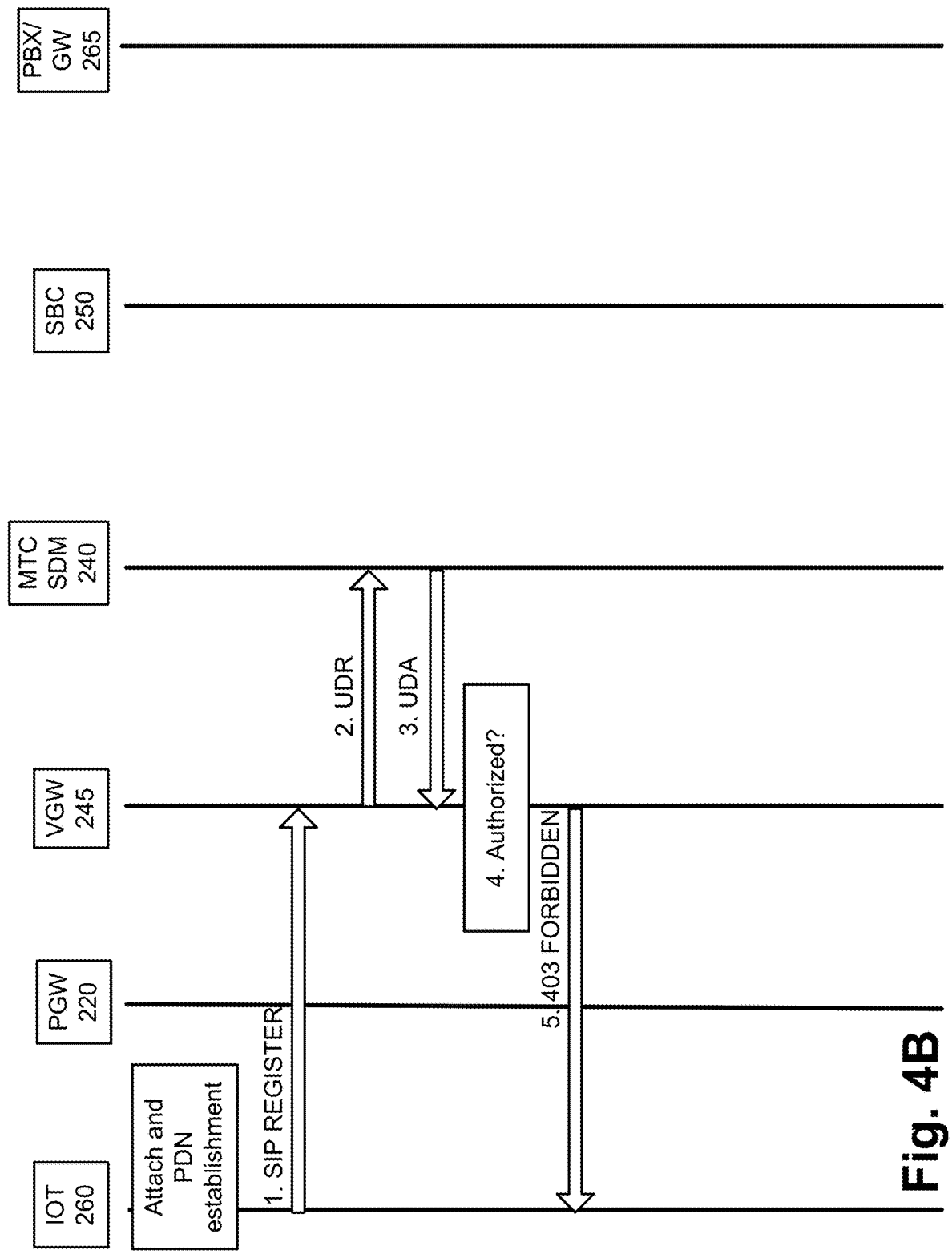
FIG. 4B is a diagram illustrating another exemplary process of the voice service.

Referring back to FIG. 3A, in step (3), MTC SDM 240 may use an MSISDN or other IoT device identifier carried in the UDR to perform the lookup in table 400. In response to the result of the lookup, MTC SDM 240 may generate and transmit a User Data Answer (UDA). For example, the UDA may include the enterprise identifier that correlates to the MSISDN or other IoT identifier of IoT device 260. The UDA may also include the IMSI and/or the MSISDN. In step (4), in response to receiving the UDA, VGW 245 may perform an authorization process. For example, VGW 245 may compare the enterprise identifier, which is obtained from the UDA, to a database, a data structure, or other file that is stored in a memory. For example, a whitelist may be implemented as a database or other file, which is stored in a memory, which stores enterprise identifiers that indicate entities that are authorized to use the voice service. Based on the result of the comparison, in step (4), VGW 245 may determine whether IoT device 260 is authorized to use the voice service. According to another exemplary implementation, VGW 245 may determine whether IoT device 260 is authorized to use the voice service based on the mere presence or absence of the enterprise identifier included in the subscription data received from MTC SDM 240. According to this exemplary scenario, assume that the enterprise identifier is included in the whitelist, and in response (in step (5)), VGW 245 may generate and transmit a 200 OK message to IoT device 260. However, referring to FIG. 4B, according to another exemplary scenario, when VGW 245 determines that IoT device 260 is not authorized to use the voice service, VGW 245 may generate and transmit a 403 Forbidden message to IoT device 260. In this case, the registration of IoT device 260 and the use of the voice service have failed. VGW 245 may deny service for a pre-configured time period. In either case, VGW 245 may store (e.g., cache) the enterprise identifier of IoT device 260.

Figure 5A:
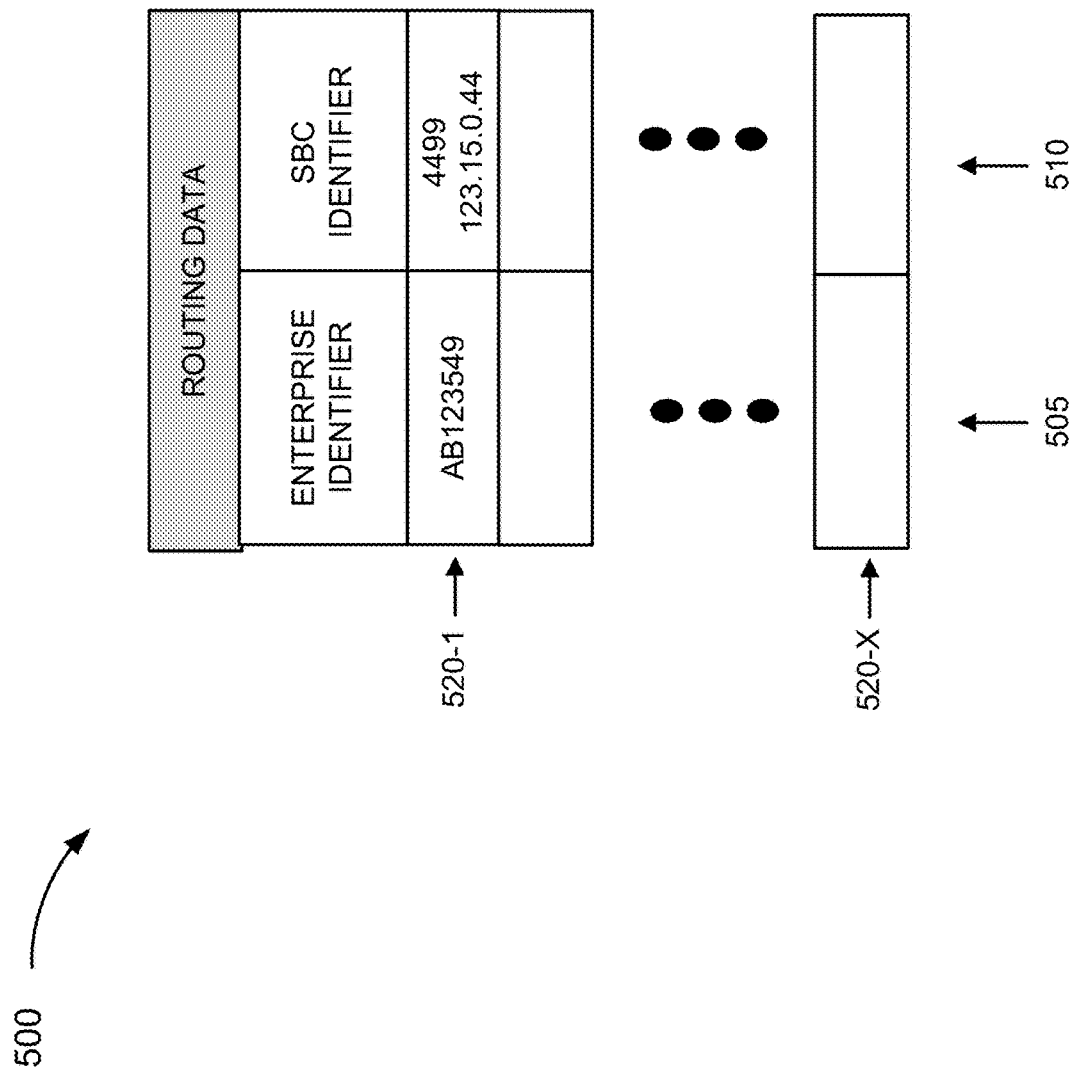
FIG. 5A is a diagram illustrating an exemplary table that stores exemplary routing data of the voice service.

Referring back to FIG. 3A, in step (6), in response to receiving the 200 OK message, IoT device 260 may generate and transmit a SIP Invite message to VGW 245. The SIP Invite message may include the SIP URI of the call center. For example, the SIP URI may be a general value (e.g., callcenter@xyz.com). In step (7), in response to receiving the SIP Invite, VGW 245 may replace the SIP URI with the enterprise identifier. In step (8), VGW 245 may transmit the SIP Invite, which includes the enterprise identifier, to SBC 250. For example, VGW 245 may correlate the enterprise identifier to an SBC based on routing data stored at VGW 245. For example, referring to FIG. 5A, an exemplary table 500 is illustrated, which stores exemplary routing data. As illustrated, table 500 includes an enterprise identifier field 505 and an SBC field 510. As further illustrated, table 500 includes records 520-1 through 520-X that each includes a grouping of fields 505 and 510 that may be correlated. The routing data is illustrated in tabular form merely for the sake of description. The routing data may be implemented in a data structure different from a table.

Enterprise identifier field 505 stores data similar in kind to that previously described in field 415 of table 400. SBC identifier field 510 stores data that indicates an identifier of an SBC (e.g., SBC 250). For example, the identifier may be implemented as a device identifier (e.g., a numeric string, an alphanumeric string, etc.) and/or a network address (e.g., an IP address, etc.). According to other exemplary implementations, table 500 may store additional, fewer, and/or different instances of routing data. The values illustrated in table 500 are exemplary.

Figure 5B:
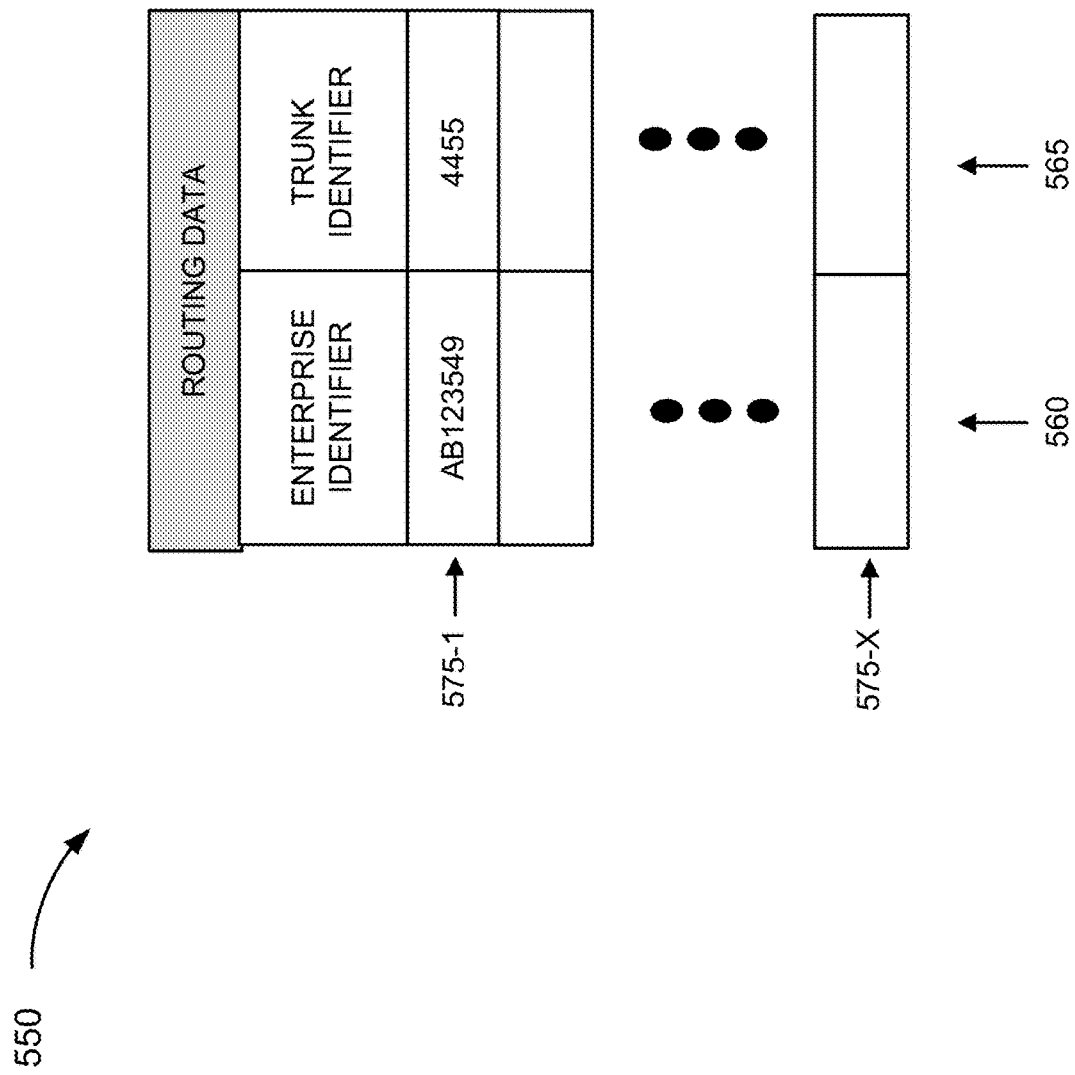
FIG. 5B is a diagram illustrating another exemplary table that stores other exemplary routing data of the voice service.

Referring back to FIG. 3A, VGW 245 may store (e.g., cache) the replaced SIP URI and the enterprise identifier. In response to receiving the SIP Invite, SBC 250 routes the SIP Invite to an appropriate trunk and call center based on the enterprise identifier. For example, SBC 250 may correlate the enterprise identifier to a trunk or a network device (e.g., a PBX GW) based on routing data stored at SBC 150. For example, referring to FIG. 5B, an exemplary table 550 is illustrated, which stores exemplary routing data. As illustrated, table 550 includes an enterprise identifier field 560 and a trunk identifier field 565. As further illustrated, table 550 includes records 575-1 through 575-X that each includes a grouping of fields 560 and 565 that may be correlated. The routing data is illustrated in tabular form merely for the sake of description. The routing data may be implemented in a data structure different from a table.

Enterprise identifier field 560 stores data similar in kind to that previously described in field 415 of table 400. Trunk identifier field 565 stores data that indicates an identifier of a trunk. For example, the identifier may be implemented as an IP or SIP trunk identifier (e.g., a numeric string, an alphanumeric string, etc.) and/or a network address (e.g., an IP address, etc.) of a PBX/GW (e.g., PBX/GW 265). According to other exemplary implementations, table 550 may store additional, fewer, and/or different instances of routing data. The values illustrated in table 550 are exemplary.

Referring to FIG. 3B, based on a result of the mapping obtained from a lookup, in step (10), SBC 250 may transmit the SIP Invite to PBX/GW 265 via the identified trunk. As illustrated in steps (11) through (20), and steps (22) through (24), the exchange of messages may adhere to the SIP protocol for establishing a SIP session (e.g., a voice call). In step (21), as illustrated, the voice call may be established between IoT device 260 and call center network 120 via PGW 220, SBC 250, and PBX/GW 265, using a suitable protocol (e.g., the Real-time Transport Protocol (RTP)). In steps (25) through (29), and (31), the exchange of messages may adhere to the SIP protocol for terminating the SIP session. According to an exemplary implementation, in step (30), VGW 245 may start a timer. For example, VGW 245 may start the timer when the voice call ends. The timer may keep track of the limited time period, as described herein. According to other exemplary implementations, VGW 245 may start the timer at a different stage of the voice call. For example, VGW 245 may start the timer responsive to any of the exemplary messages received or transmitted by VGW 245, or responsive to an operation performed by VGW 245 (e.g., step 4, step 7, etc.). The configurable time period may vary depending on when the timer is started. Upon expiration of the timer, IoT device 260 is no longer registered and is unable to place or receive a voice call without re-registering with access network 105.

Although FIGS. 3A and 3B illustrate an exemplary process of the voice service, according to other exemplary embodiments, additional, fewer, and/or different operations of the voice service may be performed. For example, as previously described, a transcoding service may be implemented. Depending on the network element/device that performs the transcoding service of the media (e.g., voice), step (21) may or may not include a media path different from that illustrated. According to an exemplary implementation, SBC 250 may perform inline transcoding when needed. According to another exemplary implementation, SBC 250 may invoke a transcoding service provided by another network element. For example, SBC 250 may communicate with a Multimedia Resource Function Control-Application Server (MRFC-AS)/Multimedia Resource Function Processor (MRFP) or other network device/element that provides the transcoding service. Additionally, for example, although not illustrated, VGW 245 may generate CDRs for billing and/or statistical purposes pertaining to the voice service, as previously described.

Figure 6A:
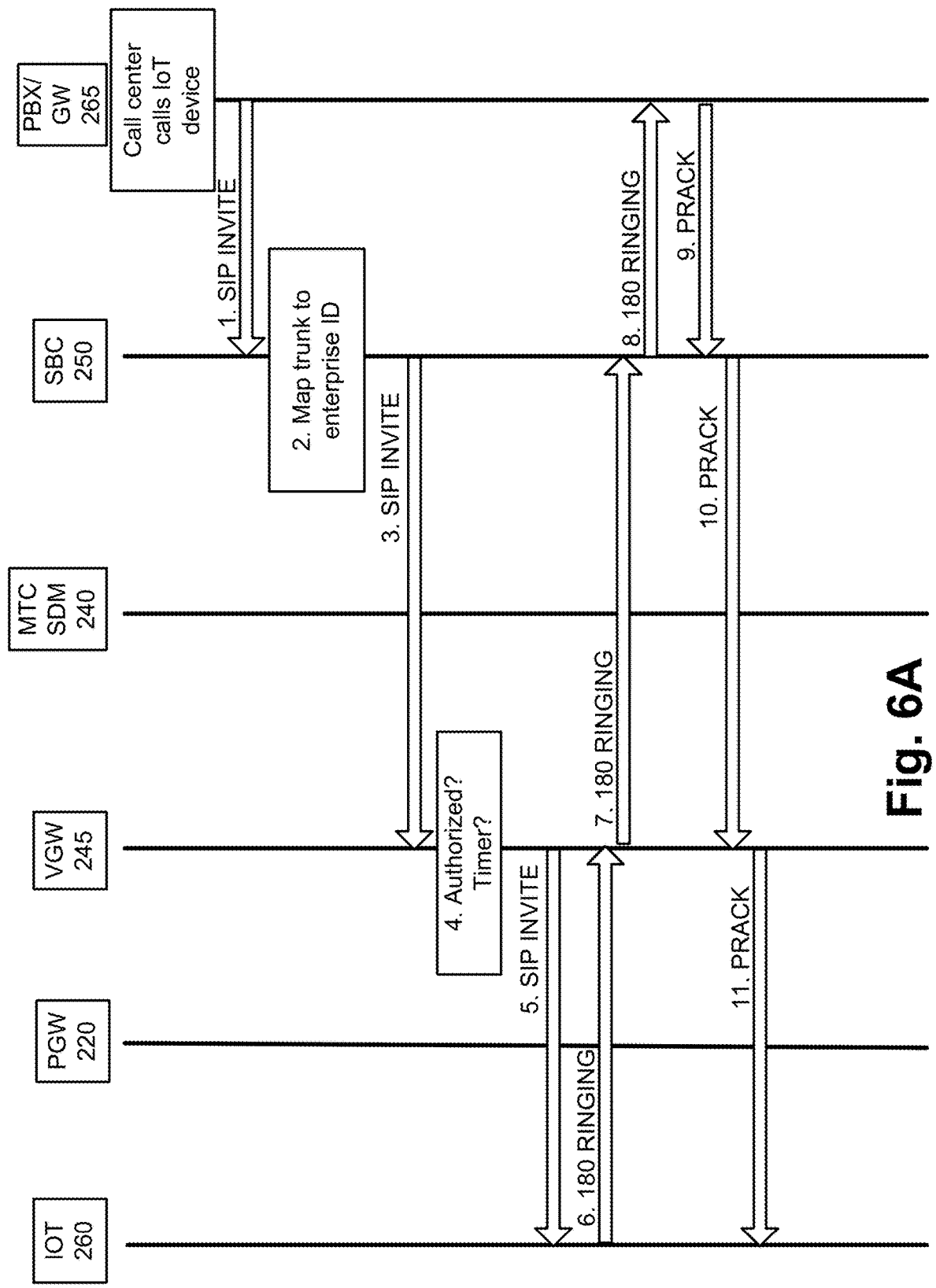
FIGS. 6A and 6B are diagrams illustrating yet another exemplary process of the voice service.
Figure 6B:
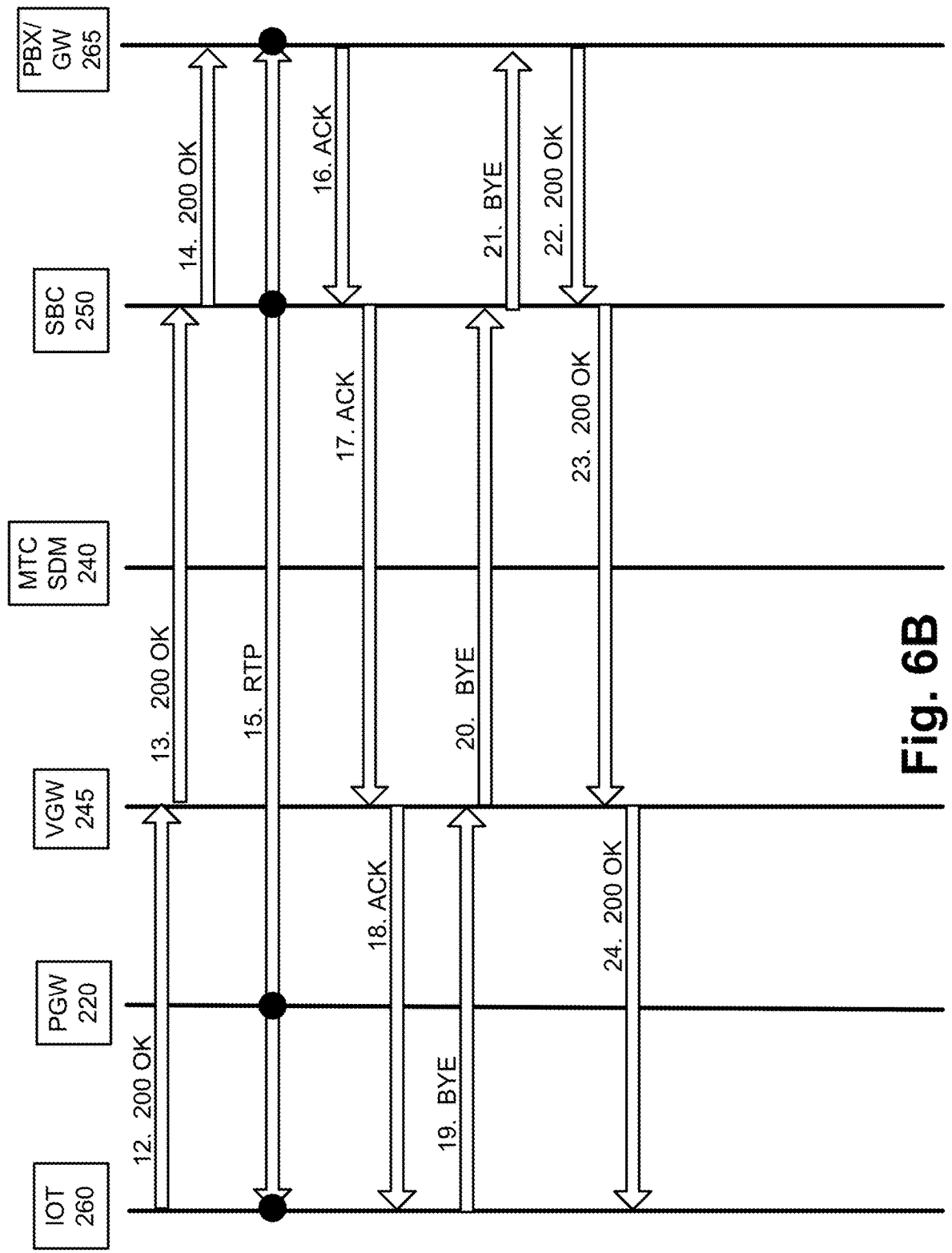

FIGS. 6A and 6B are diagrams illustrating another exemplary process of the voice service in which call center network 120 establishes a voice call with IoT device 260.

For example, according to this exemplary scenario, the call center may initiate a call back to IoT device 260. Referring to FIG. 6A, assume that PBX/GW 265 receives a message to initiate a voice call to IoT device 260. For example, the message may be a SIP Invite or other type of message. In step (1), in response, PBX/GW 265 may generate and transmit a SIP Invite to SBC 250. The SIP Invite message may or may not include the enterprise identifier. In step (2), in response to receiving the SIP Invite, SBC 250 may perform a routing process. When the SIP Invite message does not include the enterprise identifier, SBC 250 may use the routing data of table 550 to determine the enterprise identifier based on, for example, the trunk via which the SIP Invite is received. When the SIP Invite message received already includes the enterprise identifier, or subsequent to determining the enterprise identifier, SBC 250 may generate and transmit the SIP Invite to VGW 245, as illustrated in step (3).

Figure 7:
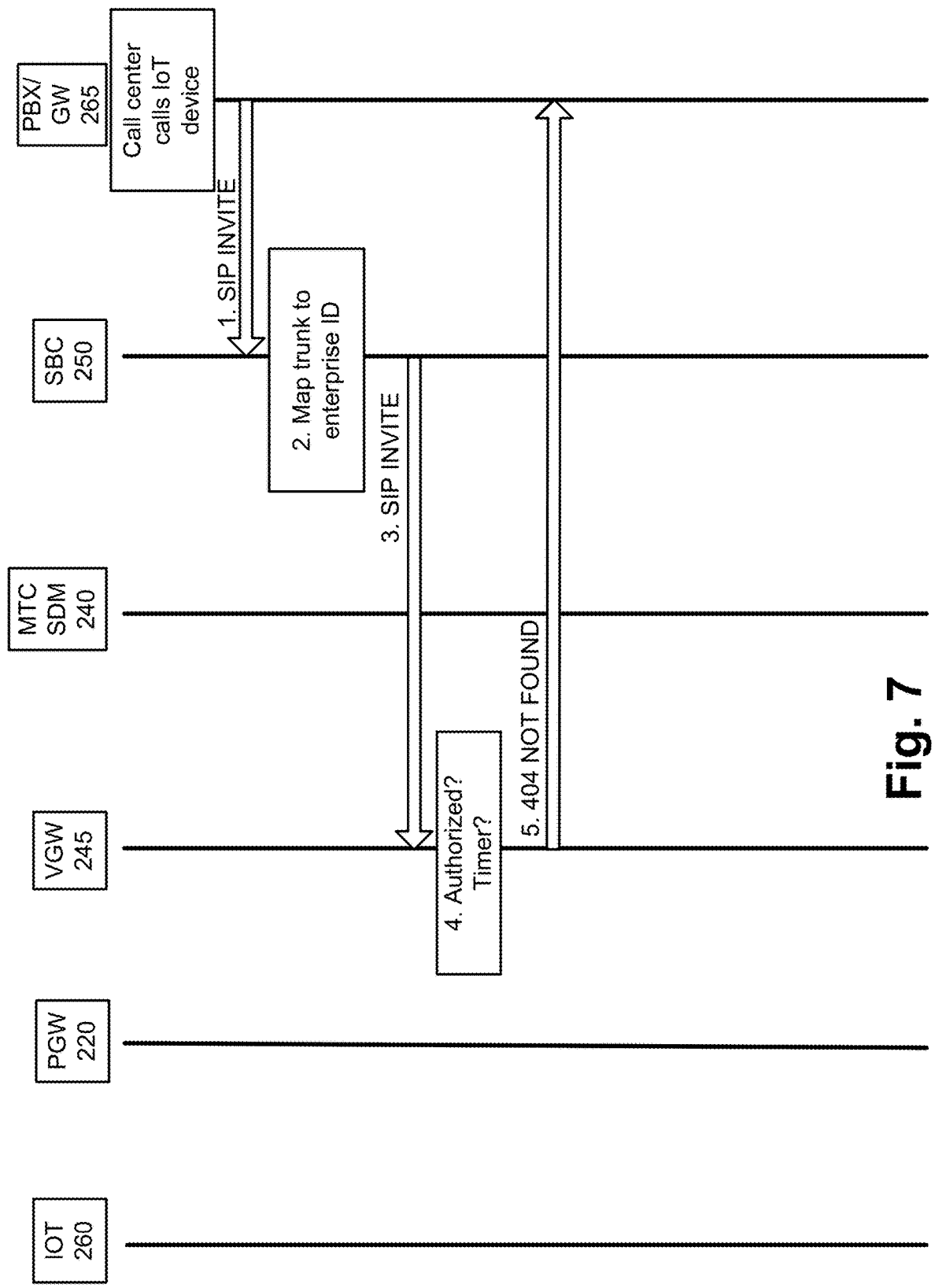
FIG. 7 is a diagram illustrating still another exemplary process of the voice service.

In step (4), in response to receiving the SIP Invite from SBC 250, VGW 245 may perform one or multiple tasks. For example, VGW 245 may determine whether IoT device 260 is currently registered. Additionally or alternatively, VGW 245 may determine whether IoT device 260 is associated with the same enterprise identifier included in the SIP Invite. For example, VGW 245 may store (e.g., cache) this information stemming from the voice call previously established in relation to FIGS. 3A and 3B. Additionally, or alternatively, VGW 245 may validate the enterprise identifier included in the SIP Invite based on, for example, the whitelist previously described. According to this exemplary scenario, it may be assumed that IoT device 260 is still registered, that the timer has not expired, and/or the enterprise identifier is valid. In step (5), in response to such determination(s), VGW 245 may generate and transmit the SIP Invite to IoT device 260. According to another exemplary scenario, when IoT device 260 is not registered, the timer has expired, and/or the enterprise identifier is not valid, referring to FIG. 7, VGW 245 may generate and transmit a client failure response. For example, when VGW 245 determines that IoT device 260 is no longer registered, VGW 245 may generate and transmit a 404 Not Found message to SBC 250.

Referring back to FIGS. 6A and 6B, as illustrated in steps (6) through (14), and steps (16) through (18), the exchange of messages may adhere to the SIP protocol for establishing a SIP session between the call center and IoT device 260. In step (15), as illustrated, a voice call may be established between call center network 120 and IoT device 260 via PGW 220, SBC 250, and PBX/GW 265, using a suitable protocol (e.g., the RTP). In steps (19) through (24), the exchange of messages may adhere to the SIP protocol for terminating the SIP session.

Although FIGS. 6A and 6B illustrate exemplary processes of the voice service, according to other exemplary embodiments, additional, fewer, and/or different operations of the voice service may be performed. For example, as previously described, a transcoding service may be implemented. Additionally, for example, although not illustrated, VGW 245 may generate CDRs for billing and/or statistically purposes pertaining to the voice service, as previously described. Also, VGW 245 may monitor the timer.

FIG. 8 is a diagram illustrating exemplary components of a device 800 that may correspond to one or more of the devices described herein. For example, device 800 may correspond to components included in end device 160, network device 115, VGW 245, SBC 250, and other network elements/devices illustrated and described herein. As illustrated in FIG. 8, device 800 includes a bus 805, a processor 810, a memory/storage 815 that stores software 820, a communication interface 825, an input 830, and an output 835. According to other embodiments, device 800 may include fewer components, additional components, different components, and/or a different arrangement of components than those illustrated in FIG. 8 and described herein.

Bus 805 includes a path that permits communication among the components of device 800. For example, bus 805 may include a system bus, an address bus, a data bus, and/or a control bus. Bus 805 may also include bus drivers, bus arbiters, bus interfaces, clocks, and so forth.

Processor 810 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 810 may be implemented as hardware (e.g., a microprocessor, etc.), a combination of hardware and software (e.g., a SoC, an ASIC, etc.), may include one or multiple memories (e.g., cache, etc.), etc.

Processor 810 may control the overall operation or a portion of operation(s) performed by device 800. Processor 810 may perform one or multiple operations based on an operating system and/or various applications or computer programs (e.g., software 820). Processor 810 may access instructions from memory/storage 815, from other components of device 800, and/or from a source external to device 800 (e.g., a network, another device, etc.). Processor 810 may perform an operation and/or a process based on various techniques including, for example, multithreading, parallel processing, pipelining, interleaving, etc.

Memory/storage 815 includes one or multiple memories and/or one or multiple other types of storage mediums. For example, memory/storage 815 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 815 may include a hard disk (e.g., a magnetic disk, an optical disk, a magneto-optic disk, a solid state disk, etc.) and a corresponding drive. Memory/storage 815 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 815 may include drives for reading from and writing to the storage medium.

Memory/storage 815 may be external to and/or removable from device 800, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 815 may store data, software, and/or instructions related to the operation of device 800.

Software 820 includes an application or a program that provides a function and/or a process. As an example, with reference to VGW 245, software 820 may include an application that, when executed by processor 810, provides the functions of the voice service, as described herein. Similarly, SBC 250 may include an application that, when executed by processor 810, provides the functions of the voice service, as described herein. Software 820 may also include firmware, middleware, microcode, hardware description language (HDL), and/or other form of instruction.

Communication interface 825 permits device 800 to communicate with other devices, networks, systems, and/or the like. Communication interface 825 includes one or multiple wireless interfaces and/or wired interfaces. For example, communication interface 825 may include one or multiple transmitters and receivers, or transceivers. Communication interface 825 may operate according to a protocol stack and a communication standard. Communication interface 825 may include an antenna. Communication interface 825 may include various processing logic or circuitry (e.g., multiplexing/de-multiplexing, filtering, amplifying, converting, error correction, etc.).

Input 830 permits an input into device 800. For example, input 830 may include a keyboard, a mouse, a display, a touchscreen, a touchless screen, a button, a switch, an input port, speech recognition logic, and/or some other type of visual, auditory, tactile, etc., input component. Output 835 permits an output from device 800. For example, output 835 may include a speaker, a display, a touchscreen, a touchless screen, a light, an output port, and/or some other type of visual, auditory, tactile, etc., output component.

Device 800 may perform a process and/or a function, as described herein, in response to processor 810 executing software 820 stored by memory/storage 815. By way of example, instructions may be read into memory/storage 815 from another memory/storage 815 (not shown) or read from another device (not shown) via communication interface 825. The instructions stored by memory/storage 815 cause processor 810 to perform a process described herein. Alternatively, for example, according to other implementations, device 800 performs a process described herein based on the execution of hardware (processor 810, etc.).

Figure 9A:
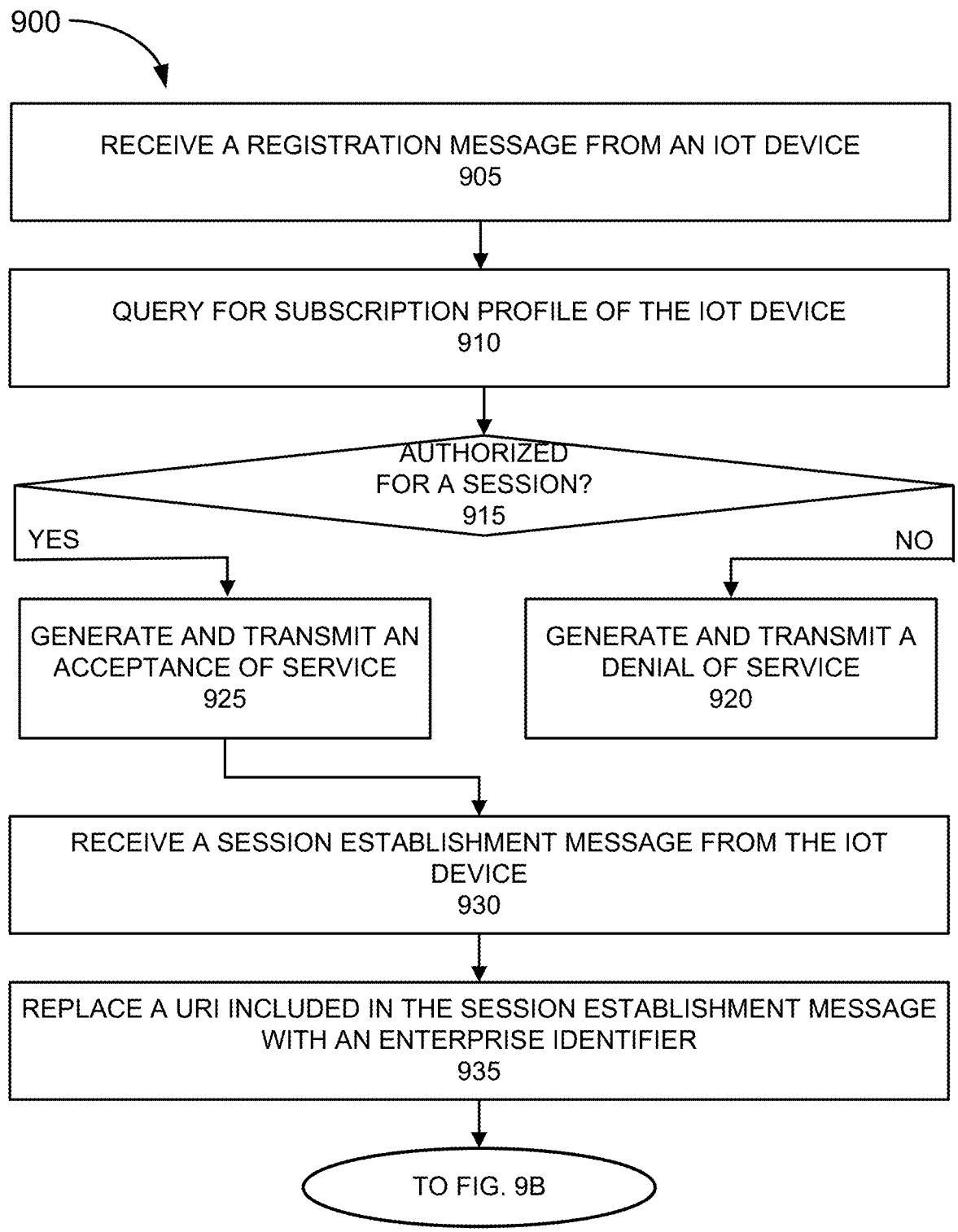
FIGS. 9A and 9B are flow diagrams illustrating an exemplary process of an exemplary embodiment of the voice service.
Figure 9B:
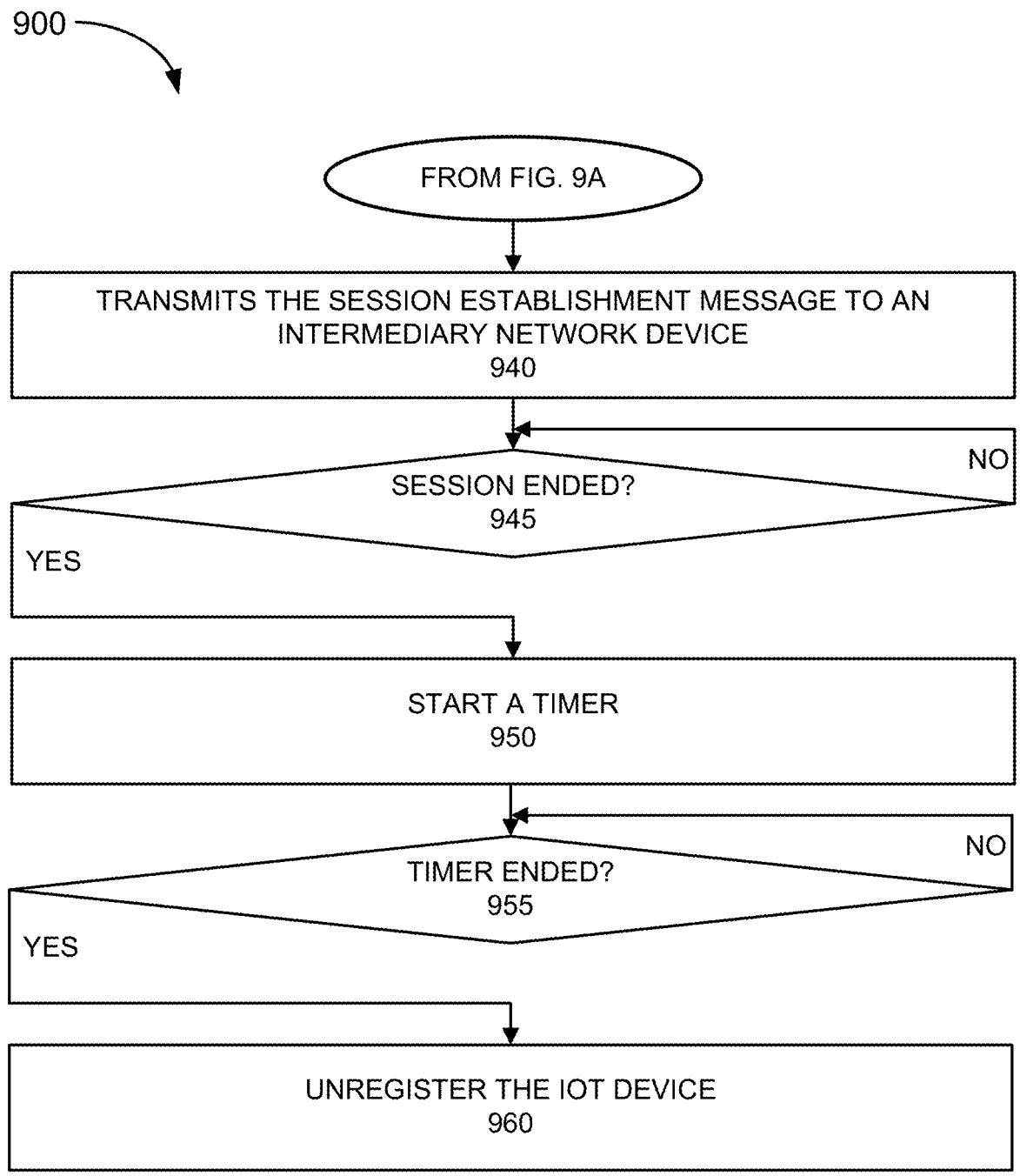

FIGS. 9A and 9B are flow diagrams illustrating an exemplary process 900 of an exemplary embodiment of the voice service. Process 900 is directed to a process previously described with respect to FIGS. 3A and 3B, as well as elsewhere in this description, in which an establishment and a termination of a media session under the voice service may be implemented. According to an exemplary embodiment, VGW 245 performs steps of process 900. For example, processor 810 executes software 820 to perform the steps illustrated in FIGS. 9A and 9B, and described herein.

Referring to FIG. 9A, block 905 of process 900, a registration message may be received from an IoT device. For example, a SIP Register message may be received from IoT device 260.

In block 910, a query for a subscription profile of the IoT device is initiated. For example, VGW 245 may query MTC SDM 240 for subscription data pertaining to IoT device 260 in response to receiving the SIP Register message. As previously described, VGW 245 and MTC SDM 240 may exchange UDR and UDA messages. VGW 245 may obtain an enterprise identifier pertaining to IoT device 260 based on the query.

In block 915, it is determined whether the IoT device is authorized for a session. For example, VGW 245 may compare the enterprise identifier to a whitelist to determine whether the enterprise identifier matches one of the enterprise identifiers included in the whitelist.

When it is determined that the IoT device is not authorized for a session (block 915-NO), a denial of service message is generated and transmitted to the IoT device (block 920). For example, when the enterprise identifier does not match one of the enterprise identifiers included in the whitelist, VGW 245 may generate and transmit a 403 Forbidden message to IoT device 260. Process 900 may end.

When it is determined that the IoT device is authorized for a session (block 915-YES), an acceptance of service message is generated and transmitted to the IoT device (block 925). For example, when the enterprise identifier does match one of the enterprise identifiers included in the whitelist, VGW 245 may generate and transmit a 200 OK message to IoT device 260.

In block 930, a session establishment message may be received from the IoT device. For example, VGW 245 may receive a SIP Invite from IoT device 260. The SIP Invite includes a SIP URI of a call center to which IoT device 260 wishes to place a voice call.

In block 935, a URI included in the session establishment message may be replaced with an enterprise identifier. For example, VGW 245 may replace the SIP URI of the call center, which is included in the received SIP Invite, with the enterprise identifier obtained from the query.

Referring to FIG. 9B, block 940, the session establishment message, which includes the enterprise identifier, is transmitted to an intermediary network device. For example, VGW 245 transmits the SIP Invite, which includes the enterprise identifier, to SBC 250. VGW 245 may select the particular SBC 250 based on the enterprise identifier.

In block 945, it is determined whether a session is ended. For example, VGW 245 may transmit and receive messages to establish a session between IoT device 260 and a call center, as previously described. According to an exemplary implementation, VGW 245 may determine whether the session has ended. For example, subsequent to transmitting a SIP Bye request (e.g., to SBC 250 or to IoT device 260), VGW 245 may receive a 200 OK message. In response to receiving the 200 OK message, VGW 245 may determine that the session has ended. According to other exemplary implementations, VGW 245 may determine that the session has ended based on the receipt of other SIP messages (e.g., SIP 5XX server failure responses, SIP 6XX global failure responses, etc.).

When it is determined that the session has not ended (block 945-NO), process 900 may revert to block 945. For example, VGW 245 may continue to monitor the state of the session. When it is determined that the session has ended (block 945-YES), a timer may be started. For example, VGW 245 may start a timer. The timer may provide a limited time period during which IoT device 260 remains registered. In block 955, it is determined whether the timer has expired. When it is determined that the timer has not expired (block 955-NO), process 900 may revert to block 955. For example, VGW 245 may continue to monitor the timer. When it is determined that the timer has expired (block 955-YES), the IoT device is unregistered (block 960). For example, VGW 245 may delete the session data of IoT device 260. IoT device 260 would have to re-register with VGW 245 in order to use the voice service again.

Although FIGS. 9A and 9B illustrate an exemplary process 00 of the voice service, according to other embodiments, process 900 may include additional operations, fewer operations, and/or different operations than those illustrated in FIGS. 9A and 9B, and described herein. For example, as previously described, the timer may be started at a time different from the ending of an initial session.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 9A and 9B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic," a "component," or an "element." The logic, the component, or the element, may include, for example, hardware (e.g., processor 810, etc.), or a combination of hardware and software (e.g., software 820). The embodiments have been described without reference to the specific software code since the software code can be designed to implement the embodiments based on the description herein and commercially available software design environments and/or languages.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 810) of a computational device. A non-transitory storage medium includes one or more of the storage mediums described in relation to memory/storage 815.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:

receiving, by a network device and from an end device, a first session establishment message pertaining to a voice service that restricts the end device to place a voice call to and receive a voice call from a designated call center;

replacing, by the network device, a uniform resource identifier of the designated call center included in the first session establishment message, with an enterprise identifier included in subscription data pertaining to the end device;

selecting, by the network device and based on the enterprise identifier, another network device to transmit the first session establishment message; and transmitting, by the network device and to the other network device, the first session establishment message based on the selecting.

2. The method of claim 1, further comprising:

determining, by the network device, whether the end device is authorized to use the voice service based on the enterprise identifier.

3. The method of claim 2, further comprising:

receiving, by the network device and from the end device, a registration message pertaining to the voice service; and transmitting, by the network device and to the end device, an acceptance message indicating a registration of the end device in response to determining that the end device is authorized to use the voice service.

4. The method of claim 1, further comprising:

transmitting, by the network device and to a subscription data device, a request for the subscription data pertaining to the end device; and receiving, by the network device and from the subscription data device, a response to the request, wherein the response includes the enterprise identifier.

5. The method of claim 1, wherein the network device provides signaling for establishments and teardowns of voice calls of the voice service, and the voice calls are not routed via the network device.

6. The method of claim 1, further comprising:

storing, by the network device, mappings between enterprise identifiers and other network devices identifiers; and searching, by the network device, the mappings based on the enterprise identifier, and wherein the selecting further comprises:

determining, by the network device, that one of the enterprise identifiers included in the mappings matches the enterprise identifier.

7. The method of claim 1, further comprising:
starting, by the network device, a timer that indicates a time window during which the end device is authorized to use the voice service.

8. The method of claim 7, further comprising:
receiving, by the network device and from the other network device, a second session establishment message, wherein the second session establishment message originates from the designated call center and is received subsequent to the starting of the timer;
determining, by the network device, whether the timer has expired; and
transmitting, by the network device and to the other network device, a denial message in response to determining that the timer has expired.

9. A network device comprising:
a communication interface;
a memory, wherein the memory stores instructions; and
a processor, wherein the processor executes the instructions to:
receive, via the communication interface and from an end device, a first session establishment message pertaining to a voice service that restricts the end device to place a voice call to and receive a voice call from a designated call center;
replace a uniform resource identifier of the designated call center included in the first session establishment message, with an enterprise identifier included in subscription data pertaining to the end device;
select, based on the enterprise identifier, another network device to transmit the first session establishment message; and
transmit, via the communication interface and to the other network device, the first session establishment message based on the selection.

10. The network device of claim 9, wherein the processor further executes the instructions to:
determine whether the end device is authorized to use the voice service based on the enterprise identifier.

11. The network device of claim 10, wherein the processor further executes the instructions to:
receive, via the communication interface and from the end device, a registration message pertaining to the voice service; and
transmit, via the communication interface and to the end device, an acceptance message indicating a registration of the end device in response to a determination that the end device is authorized to use the voice service.

12. The network device of claim 9, wherein the processor further executes the instructions to:
transmit, via the communication interface and to a subscription data device, a request for the subscription data pertaining to the end device; and
receive, via the communication interface and from the subscription data device, a response to the request, wherein the response includes the enterprise identifier.

13. The network device of claim 12, wherein the network device provides signaling for establishments and teardowns of voice calls of the voice service, and the voice calls are not routed via the network device.

14. The network device of claim 9, wherein the processor further executes the instructions to:
store mappings between enterprise identifiers and other network devices identifiers; and
search the mappings based on the enterprise identifier, and wherein, when selecting, the processor further executes the instructions to:
determine that one of the enterprise identifiers included in the mappings matches the enterprise identifier.

15. The network device of claim 9, wherein the processor further executes the instructions to:
start a timer that indicates a time window during which the end device is authorized to use the voice service.

16. A non-transitory, computer-readable storage medium storing instructions executable by a processor of a network device, which when executed cause the network device to:
receive from the end device, a first session establishment message pertaining to a voice service that restricts the end device to place a voice call to and receive a voice call from a designated call center;
replace a uniform resource identifier of the designated call center included in the first session establishment message, with an enterprise identifier included in subscription data pertaining to the end device;
select, based on the enterprise identifier, another network device to transmit the first session establishment message; and
transmit to the other network device, the first session establishment message based on the selection.

17. The non-transitory computer-readable storage medium of claim 16, further storing instructions executable by the processor of the network device, which when executed cause the network device to:
store mappings between enterprise identifiers and other network devices identifiers; and
search the mappings based on the enterprise identifier, and wherein the instructions to select further comprises instructions, which when executed cause the network device to:
determine that one of the enterprise identifiers included in the mappings matches the enterprise identifier.

18. The non-transitory computer-readable storage medium of claim 16, wherein the instructions to obtain comprise further instructions executable by the processor of the network device, which when executed cause the network device to:
transmit to a subscription data device, a request for subscription data pertaining to the end device; and
receive from the subscription data device, a response to the request, wherein the response includes the enterprise identifier.

19. The non-transitory computer-readable storage medium of claim 16, further storing instructions executable by the processor of the network device, which when executed cause the network device to:
determine whether the end device is authorized to use the voice service based on the enterprise identifier.

20. The non-transitory computer-readable storage medium of claim 16, further storing instructions executable by the processor of the network device, which when executed cause the network device to:
start a timer that indicates a time window during which the end device is authorized to use the voice service.

* * * * *